UNITED STATES PATENT OFFICE.

GEORGE LUNGE, OF ZURICH, SWITZERLAND, AND FARNHAM MAXWELL LYTE, OF LONDON, ENGLAND.

PROCESS OF MAKING NITRIC ACID AND CAUSTIC ALKALI.

SPECIFICATION forming part of Letters Patent No. 514,124, dated February 6, 1894.

Application filed August 23, 1893. Serial No. 483,801. (No specimens.)

*To all whom it may concern:*

Be it known that we, GEORGE LUNGE, professor of chemistry at The Polytechnicum, Zurich, Switzerland, and FARNHAM MAXWELL LYTE, analytical chemist, of 60 Finborough Road, London, S. W., England, have invented or discovered new and useful Improvements in the Production of Nitric Acid, Caustic Alkali, and Ferric Oxid, of which the following is a full, clear, and exact description.

This invention relates to improvements in the decomposition of alkaline nitrates for the production of nitric acid and caustic alkali, and incidentally to the production from purple ore, hematite, or other crude ferric oxids, of ferric oxid in a fine state of division suitable for use as a pigment or for polishing purposes (jeweler's rouge) or for any other purpose for which Venetian red is employed.

It has heretofore been proposed to effect the decomposition of alkaline nitrate by ferric oxid (as an incidental step in a process of producing chlorin) merely for the purpose of regenerating the nitric acid used in the process and obtaining caustic alkali as a by product. The reaction is similar whether nitrate of soda or nitrate of potash is decomposed and therefore wherever in the following description a sodium compound is referred to the corresponding potassium compound is to be included. The decomposition was proposed to be effected by applying external heat to the nitrate in admixture with an equal amount (or less) of ferric oxid with a view to form an alkaline ferrite and evolve nitrous fumes; but although the whole of the nitrate can be decomposed in this way the recovery of the nitric acid is very incomplete, owing to the fact that the fluxing of the mass renders such a high temperature necessary to effect the decomposition of the nitrate as to cause the splitting up of a considerable quantity of the nitrogen oxids too far for recovery as nitric acid.

This invention has for its object to overcome this objection, and it consists in maintaining the mass in a porous condition throughout the operation so as to render it easily permeable, and heating it not only externally but also internally by subjecting it to the action of a mixed current of heated air and steam, whereby complete decomposition is effected and the evolution of nitrous fumes wholly or almost wholly convertible into nitric acid is rendered possible, at a much lower temperature than when the fluxing of the mass into a mixed solid and liquid condition is permitted.

In carrying out the process, such a quantity of ferric oxid is intimately mixed with the nitrate that the resulting mass will not fuse at the temperature of the reaction but will remain solid and porous throughout the operation of decomposition. Supposing the alkaline nitrate to be in solution the mixing with it of the ferric oxid would be preferably effected while evaporating the solution to dryness so as to effect a uniformly intimate mixture; but the mixture of the two materials may also be effected when in the dry state. The mass remains porous when heated and is easily permeable by the mixed current of heated air and steam which is forced through it in any convenient way, suitable provision being made for the collection of the nitrous fumes and their conversion into nitric acid.

It has been found when employing ferric oxid in the shape of "purple ore" that the best proportion is about two parts thereof by weight to one of nitrate of soda, but the invention is not limited to that particular quality of ferric oxid, nor to that particular proportion, as it may be possible according to the physical state of the ferric oxid, its degree of division, &c., to use less than the proportion indicated, but the quantity must always be sufficient to prevent any fluxing of the mass. It is not, however, sufficient to thus prevent the fluxing of the mass, but it is also essential to effect the decomposition at a temperature sufficiently low to enable the nitrous fumes evolved to be wholly recoverable or nearly so, as nitric acid, and this is effected by subjecting the mass to the intimate action of a mixed current of heated air and steam. The mixed current of air and steam should be heated preferably to the same temperature as that of the mass, say to a degree corresponding to an incipient red heat, which in practice we find to be between 450° centigrade and 550° centigrade, although any temperature between 300° and 700° centigrade will be found effective, and when the heated current is passed through the porous mass obtained by mixing nitrate of soda and ferric oxid as above mentioned, a dirty green mass is formed consisting essentially of ferrite of soda, with evolution of nitrous fumes, the temperature at which the decomposition is effected being such that most of the nitric acid corresponding to the nitrate of soda used is recoverable by air and water in the ordinary way, no sodium nitrate or nitrite remaining and only a very slight proportion of the oxids of nitrogen becoming destroyed. Steam alone is unsuitable, even if superheated, and although hot air alone acts better than steam a mixture of air and steam previously heated to the temperature which prevails in the decomposing retort gives much the best results. The quantity of steam is regulated in such manner that the recovered nitric acid is not too weak, and the quantity of air is kept in due excess for reconverting the lower oxids of nitrogen into nitric acid by means of a "Lunge tower" or other suitable contrivance. The resulting ferrite is to be decomposed by heating it with water whereby ferric oxid is precipitated and the alkaline base enters into solution and is recovered as caustic alkali by evaporation in the ordinary way. This process differs essentially from that described in the specification of British Letters Patent granted to Adolph Vogt, dated December 16, 1891, No. 22,018, according to which alkaline nitrate is mixed with a material which will remain inert and physically and chemically unaltered in presence of the nitrate while being heated in a current of carbonic acid with or without heated air or heated air and steam.

The purpose of mixing refractory or inert material with the alkaline nitrate is to prevent fusion of the mass and cause it to remain throughout in porous condition so as to be permeable by gaseous currents, but the use of carbonic acid is prescribed as an indispensable part of the process and herein lies the essential difference between Vogt's process and the process of this invention since in the presence of carbonic acid the alkaline base of the nitrate does not chemically combine to any considerable extent with any of the materials specified by Vogt, even oxid of iron remaining inert and chemically unaltered, the residue after heating in a current of carbonic acid in the manner described in Vogt's specification consisting of a mechanical mixture of carbonate of the alkali and oxid of iron. In the process of this invention, however, in which no carbonic acid is employed, the ferric oxid so far from remaining inert is the most essential chemical agent for effecting decomposition of the alkaline nitrate by displacing the nitric acid and combining with the alkaline base to form a true chemical compound known as a ferrite of the alkali which is only by prolonged heating in water decomposable into ferric oxid and caustic alkali. The reaction therefore differs entirely from that specified by Vogt, and the process also differs essentially from Vogt's process by the fact that a much more valuable residual product is obtained, namely caustic alkali in lieu of the alkaline carbonate produced by Vogt.

The ferric oxid formed by the decomposition of the alkaline ferrite is in an extremely fine state of division and it is possible to separate this recovered oxid from the excess of purple ore, hematite, or other ferric oxid present, by means of levigation, thus obtaining a substance fit for use as paint, or for polishing purposes, or for any other object for which Venetian red is employed.

Having now particularly described and ascertained the nature of the said invention and in what manner the same is to be performed, we declare that what we claim is—

1. The herein described process of decomposing an alkaline nitrate in admixture with ferric oxid in sufficient quantity to maintain the porosity of the mass, which process consists in subjecting the heated mass to the action of heated air and steam at a temperature sufficient to convert the whole of the alkaline base into a ferrite of the alkali, with the evolution of nitrous fumes convertible into nitric acid in the ordinary way.

2. The herein described process of producing nitric acid and caustic alkali and recovering ferric oxid in a finely divided state, which process consists in first admixing an alkaline nitrate with crude ferric oxid in sufficient quantity to maintain the porosity of the mass, in then subjecting the heated mass to the action of heated air and steam at a temperature sufficient to convert the whole of the alkaline base into an alkaline ferrite and evolving nitrous fumes, converting the same into nitric acid, and in then decomposing the alkaline ferrite by hot water for recovery of the caustic alkali and ferric oxid, as herein specified.

3. The herein described process of producing nitric acid and caustic alkali, and recovering ferric oxid in a finely divided state, which process consists in first admixing an alkaline nitrate with crude ferric oxid in sufficient quantity to maintain the porosity of the mass, in then subjecting the heated mass to the action of heated air and steam at a temperature sufficient to convert the whole of the alkaline base into an alkaline ferrite, and evolving nitrous fumes, converting the same into nitric acid, in then decomposing the alkaline ferrite by hot water for recovery of the caustic alkali and ferric oxid, and then separating the lighter from the heavier portions of ferric oxid, as and for the purpose specified.

GEORGE LUNGE.
FARNHAM MAXWELL LYTE.

Witnesses as to the signature of George Lunge:
 K. GEINEMANN,
  *Zurich, Chemist.*
 T. GLOOR,
  *Zurich, Clerk.*

Witnesses as to the signature of Farnham Maxwell Lyte:
 W. M. HARRIS,
17 *Gracechurch Street, London, Notary Public.*
 M. HANDFORD,
60 *Finboro' Rd., London, Savant.*